United States Patent Office 3,166,391
Patented Jan. 19, 1965

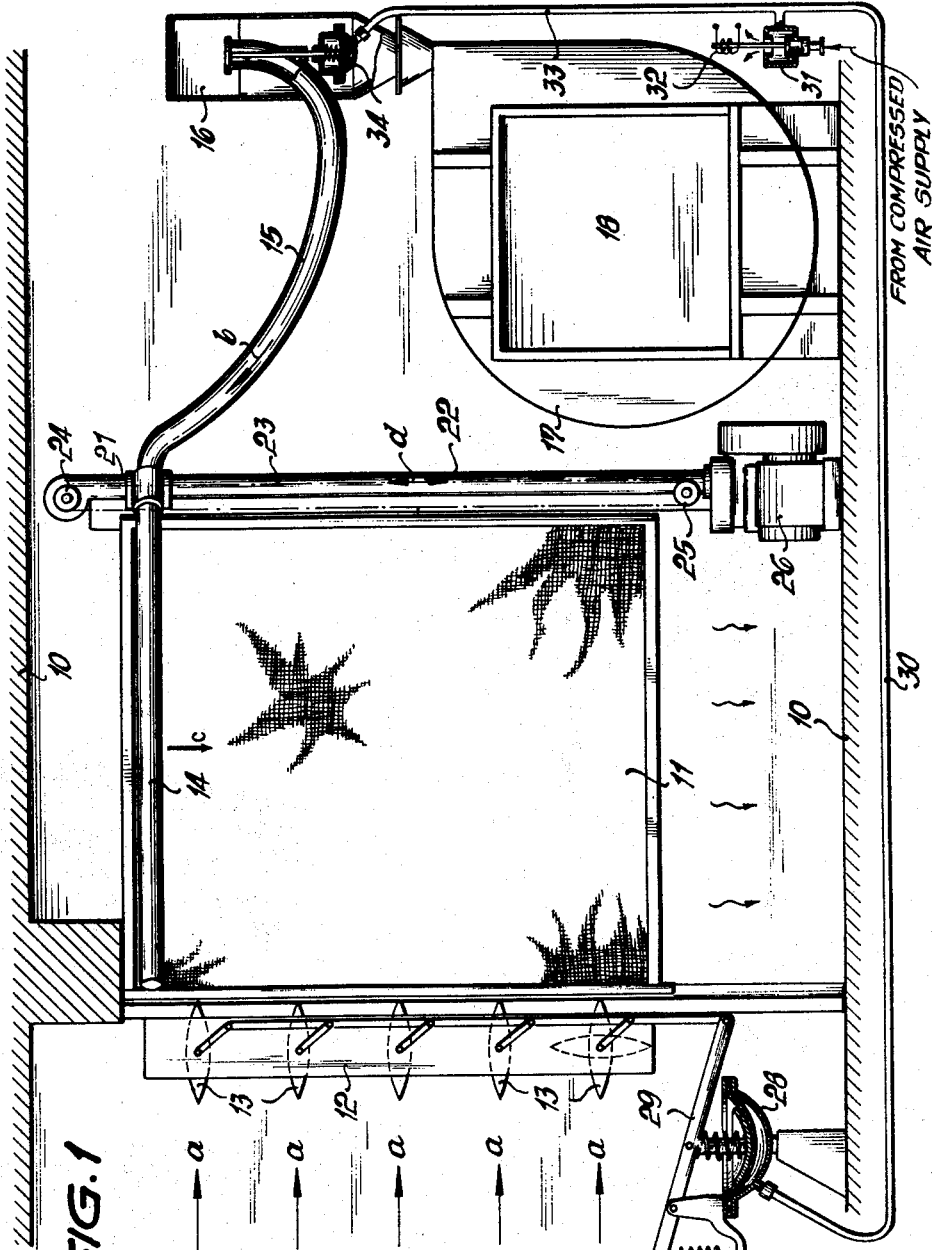

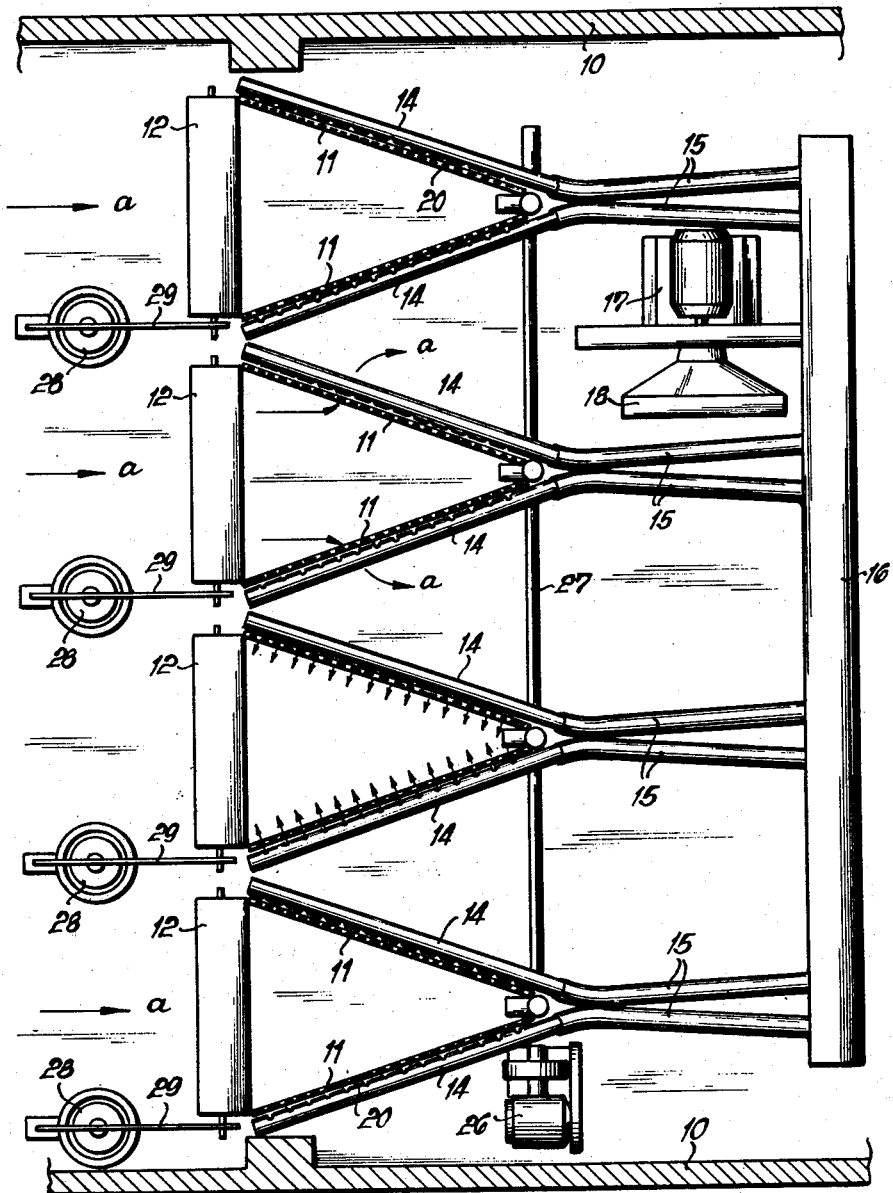

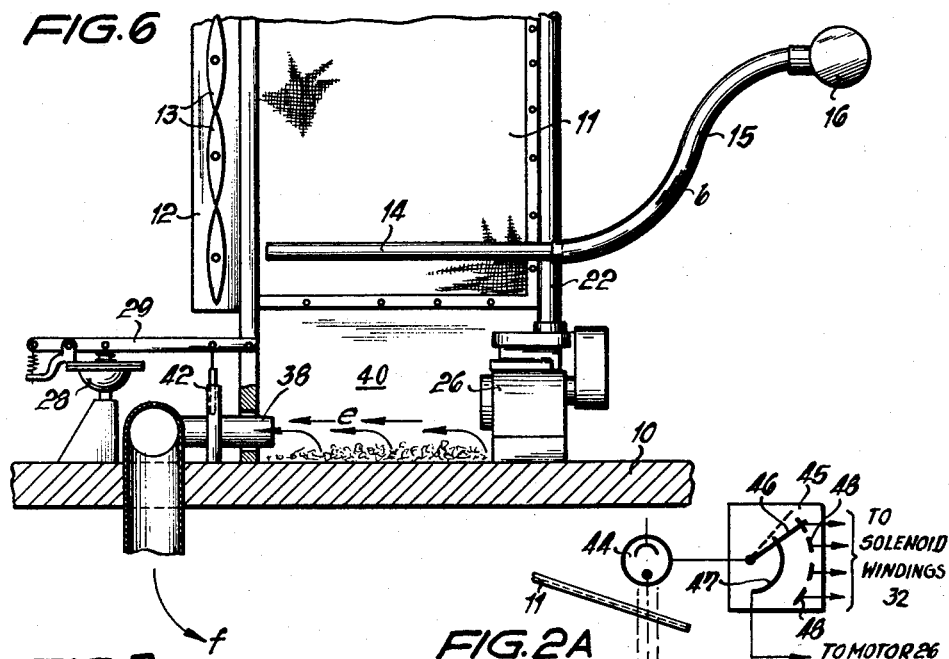
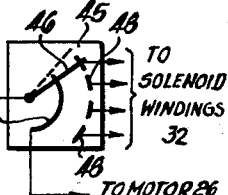
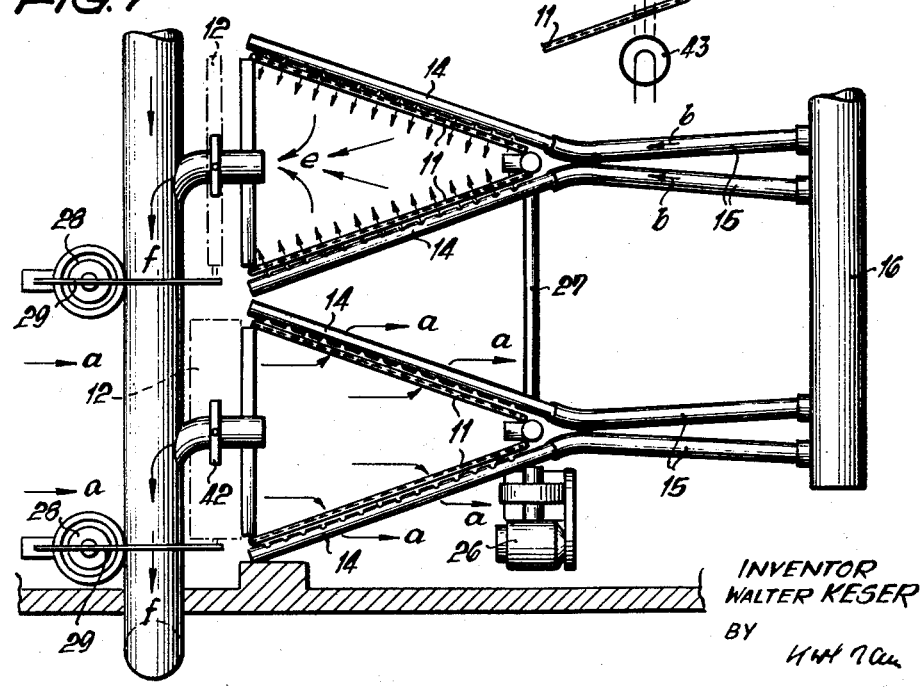

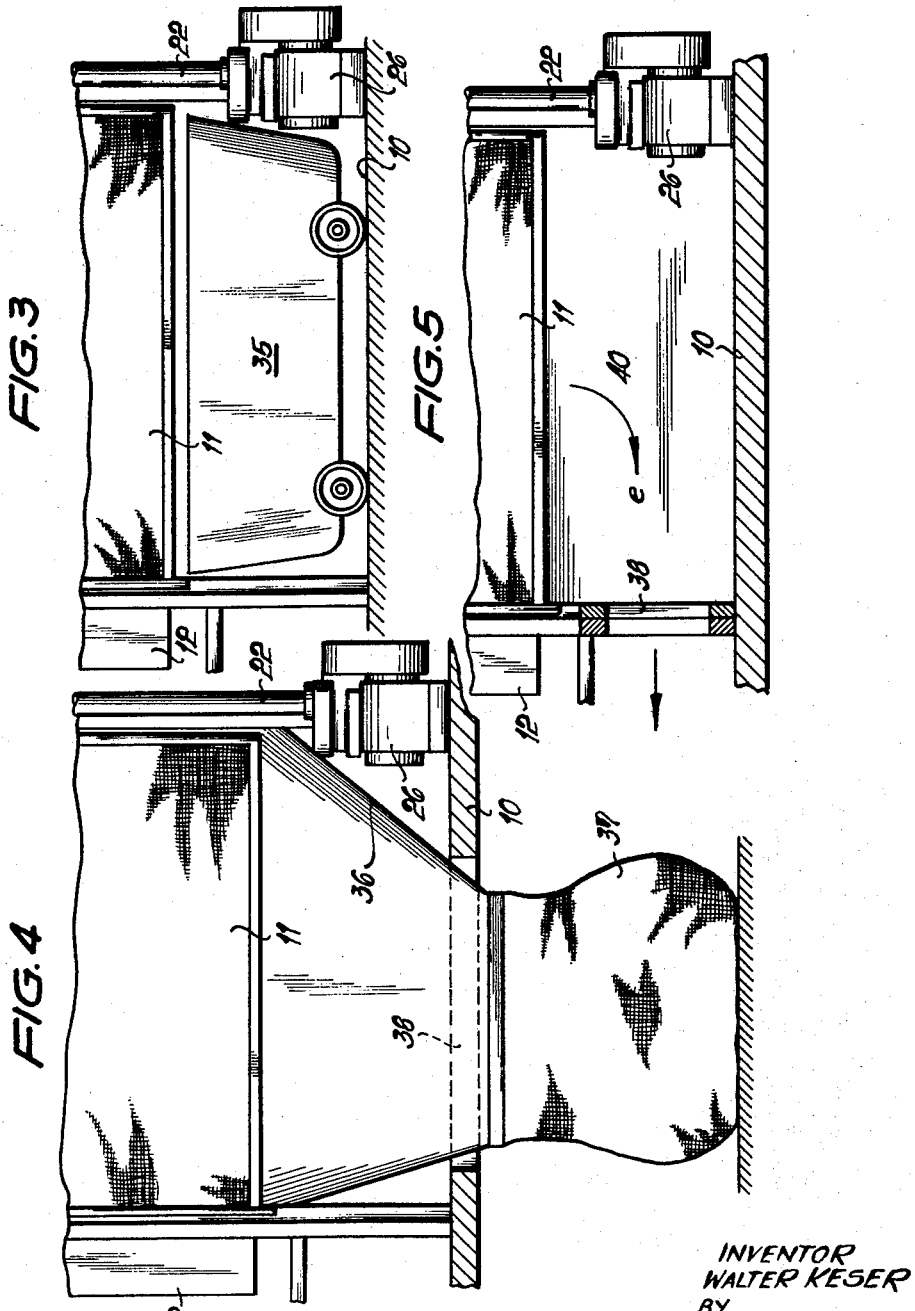

3,166,391
FILTER CLEANING DEVICE FOR AIR EXHAUST SYSTEMS AND THE LIKE
Walter Keser, Stuttgart-Feuerbach, Germany, assignor to Lufttechnische Gesellschaft m.b.H., Stuttgart-Zuffenhausen, Germany, a corporation of Germany
Filed Mar. 30, 1961, Ser. No. 99,575
Claims priority, application Germany, Apr. 11, 1960, L 35,884
5 Claims. (Cl. 55—273)

The present invention relates to filtering devices for extracting dust, lint, fibers and other fine particles from an air or the like stream, such as the air exhaust stream of a ventilating, air conditioning or the like system or installation, more particularly to devices of this type comprising a filter screen or unit of metal or plastic screen, cloth or the like air pervious material and being disposed in an exhaust air conduit or the like to intercept and remove undesired particles from the stream passing through said conduit.

In the operation of filtering devices of this type difficulties have been encountered in the past to maintain the filters at optimum operating efficiency by removing contaminating material or particles collected therein during the filtering operation, by the provision of suitable filter cleaning means. Among other drawbacks, this has necessitated either the use of a large number of separate cleaning units each arranged in one of the multiple exhaust ducts of conventional air conditioning or ventilating systems, or the complete shutting off of the exhaust stream during the cleaning operations if the filter is disposed in the main exhaust conduit of the ventilating or the like system.

Accordingly, among the objects of the present invention is the provision of an improved filter cleaning system or device for use in connection with ventilating, air conditioning or the like systems involving the use of an air or the like stream carrying dust, fibers and the like fine particles to be extracted and removed from said stream, which is substantially devoid of the aforementioned and related drawbacks and defects of the known filter devices according to the prior art; which will enable a cleaning operation of the filters to be carried out without interruption of the main exhaust air or the like stream to be filtered; which is adapted for automatic control of the screen cleaning operation substantially without attendance such as to ensure filtering at all times efficiently and expeditiously; and which is both simple in design and construction, as well as relatively inexpensive in manufacture and economical in operation.

The invention, both as to its ancillary objects and novel objects, will be better understood from the following detailed description taken in reference to the accompanying drawings, forming part of this specification and in which:

FIG. 1 is an elevational view of a filtering arrangement constructed in accordance with the principles of the invention and suitable for use in the exhaust conduit of an air conditioning, ventilating or the like system;

FIG. 2 is a plan view on a different scale of the system shown in FIG. 1;

FIG. 2A is a schematic diagram illustrating by way of example the automatic control of the screen cleaning operation in the system according to FIGS. 1 and 2;

FIGS. 3 to 5 are partial elevational views illustrating different means for and methods of disposing of the material extracted from the exhaust air stream or the like in a system according to FIGS. 1 and 2; and FIGS. 6 and 7 are further partial elevational plan views, respectively, of a preferred arrangement for the removal of the material collected by the filtering and cleaning system according to the invention.

Like reference characters denote like parts throughout the different views of the drawings.

With the foregoing objects in view, the invention involves generally the provision of an improved screen cleaning device or system for use in connection with air filtering or the like apparatus for extracting dust, fibers and other fine particles from a stream of air or the like being passed through a conduit with one or more filter elements, such as wire screen, cloth or the like filters of air pervious material, being disposed within said conduit to intercept and remove the particles contained in said stream. Essentially, the cleaning device according to the invention comprises at least one blowing tube arranged closely adjacent to the surface of a screen on the downstream side in respect to the air exhaust or the like stream being filtered, said tube being provided on its side adjacent to said screen with a multiplicity of orifices or exit ports forming nozzles and which serve to direct a number of cleaning air jets unto the screen surface upon connection of the tube to a source of compressed air. There are provided further means to move the tubes over the screen area, to expel the collected particles from the entire screen. The exhaust or the like stream through the screen or screens is advantageously shut off or interrupted during the cleaning operation, to prevent interference with the effective expulsion and removal of the material collected by the screen during the preceding filtering operation.

According to a preferred embodiment of the invention, to avoid a complete shutting off of the main exhaust or the like stream during a screen cleaning operation, being especially suitable for utilization in the main exhaust duct or conduit of a ventilating or the like system, as used in factories, textile mills etc., the filter is comprised of a plurality of juxtaposed component screen or filter units disposed across said conduit and being provided with individual shutters preceding said units, to block or interrupt the partial streams through the respective units, whereby to enable the cleaning of each unit at a time without interruption of the main or total exhaust stream passing through the system. Such an arrangement has the further advantage of reduced operating power in applying compressed air to the blowing tubes of the screens and in operating said tubes and the other parts of the system during a cleaning operation, as a result of the sequential cleaning of the component screens or units constituting the composite filter structure of the ventilating or the like system.

Moreover, a fractionalized cleaning system of this type lends itself readily to automatic operation, either at predetermined time intervals controlled by a suitable timing device designed to suit existing operating conditions and requirements, or controlled preferably or initiated by a suitable sensing means responsive to the degree of contamination or clogging of the screen by the particles or foreign matter collected therein. As an example, the screens or units may be sequentially cleaned by uncontrol of the operation of the respective blowing tubes, the connection of the tubes to the source of compressed air supply and closing of the respective shutters of the unit to be cleaned. This sequential operation may be initiated, for instance, by a photoelectric cell impinged by a light beam or the like passing through the screen or screens and being connected in an electric circuit such as to produce a control current upon the occurrence of a predetermined degree of contamination of the screens adapted to start a time control switch, in a manner described in further detail hereinafter.

The particles or material expelled from the screens by the blowing operation may be collected and removed together with the disposal of the material extracted during the filtering operation proper of the main exhaust stream in any suitable manner, either separately or in synchronism with the filter cleaning operations, to suit any existing operating conditions and requirements.

Referring more particularly to FIGS. 1 and 2 of the drawings, the numeral 10 indicates a preferably horizontal channel or conduit through which is passed, in the direction of the arrows $a$, an air or the like stream containing dust, fibers and other undesirable fine particles to be extracted and removed by the filtering device according to the invention, such as the exhaust duct or conduit of a ventilating, air conditioning or the like plant or system. Mounted within and across the conduit 10 are a plurality of juxtaposed filtering screens or screen elements 11 which may be in the form of rigid filter plates or may consist of sections of metal screen, cloth or the like perforate or air-pervious material supported by or mounted in suitable frames and being arranged preferably angularly in pairs, each pair of adjoining screen elements 11 forming an angle with the apices of the angles or V-shaped screen units pointing in the flow direction $a$ or direction of movement of the exhaust or the like stream being filtered. The screen sections or filters 11 serve to intercept or extract dust, fibers or the like undesirable foreign particles contained in the air, as is customary in the operation of ventilating and air conditioning plants of textile mills and in general any installation involving the problem of filtering or cleaning an air or the like stream. In the embodiment shown, each two adjoining screen sections 11 form a complete filter unit, four such units being shown in the example illustrated in the drawing and disposed across the conduit 10. Each of the juxtaposed screen or filter units is preceded by a shutoff device or adjustable shutter 12 adapted to block or interrupt the partial air stream through the respective filter or dust collecting unit. The shutters 12 may be of any suitable construction, such as in the form of louver or Venetian blind shutters having adjustable slats or shutter blades 13 as shown in the drawing.

Disposed close to the exit or downstream sides, in respect to the flow direction $a$, of the screens 11 are a plurality of blowing tubes 14, that is, one such tube for each screen being arranged to extend horizontally and across the screens in the example illustrated. The tubes 14 are connected with a compressed air supply line or reservoir 16 through flexible rubber tubes 15, to supply air under suitable pressure to the tubes, as indicated by the arrow $b$ in the drawing. Reservoir 16 may in turn be connected to a compressor or the like source 17 supplying fresh compressed air and having an air intake filter 18.

The blowing tubes 14 are provided with a multiplicity of orifices or exit ports 20 on the sides thereof adjacent to the screens 11 which serve to produce a plurality of compressed air jets directed against the screens, to expel dust, fibers and other foreign material collected therein from the exhaust stream into the space enclosed by the screens of a filter unit, from where the collected and accumulated material, consisting both of the intercepted particles resulting from the normal filtering action of the stream and of the particles collected within the interstices of and expelled from the screens during a cleaning or blowing operation, may be removed by any suitable means or method as will be described presently.

The tubes 14 of each pair of adjoining screen elements or each V-shaped filter are attached to supports 21 movable along vertical guides or columns 22. Each guide or support 21 is connected to an endless conveyor or chain 23 cooperating with a pair of sprocket wheels 24 and 25 mounted at the top and bottom, respectively of the guide columns 22, with the wheels 25 of all the units being driven by a common electric motor 26 through a shaft or coupling 27, in such a manner as to move the tubes 14 across the effective areas of the screens 11, as indicated by the arrow $c$ in FIG. 1. The motor 26 is advantageously of the reversible type with suitable control means such as microswitches being provided and operably connected with the tubes or operating organs controlling the same, to effect a reciprocating movement of the chain 23, as indicated by the arrow $d$ and, in turn, an up and down movement of the tubes 14 across the screens 11 such as to thoroughly and effectively clean the latter during a blowing operation. In place of the chain and sprocket drives shown for the operation of the blowing tubes, any other known means or operating mechanism suggesting itself to those skilled in the art may be utilized for converting the rotary motion of the motor 26 into an up and down or reciprocating movement of the tubes 14.

The blowing operation to expel dust, fibers and other particles collected by the screens 11 and the removal of the accumulated material from the space between the screens is advantageously carried out with the partial air stream through the respective filter unit subjected to cleaning being interrupted, inasmuch as the main exhaust stream acts to retain the material or particles within the screens such as to interfere with the effective cleaning or blowing operation. For this purpose, it is advantageous to first close the shutter preceding a filter unit to be cleaned and to subsequently supply compressed air from the reservoir 16 to the associated blowing tubes 14 through the flexible tubes 15 (arrow $b$). At the same time, the tubes 14 are moved up and down over the surface of the screens of the unit being cleaned, whereby to expel or blow the material collected by the screens into the space between and below the screens on the up stream side of the filters.

In order to control the shutters 12, the slats 13 may be operated by suitable actuating devices, such as pneumatic actuators 28 as shown in FIG. 1 by way of example. The actuators may be of known construction comprising a diaphragm operable by compressed air supplied from a line 30 through a solenoid-controlled pneumatic control valve 31, said diaphragm being in turn operably connected to a control lever 29 which serves to operate the adjusting or control organ of the shutters 12. In the case of the present invention, with the shutters 12 being normally in the open position, FIG. 1, the slats will be operated to closed position, FIG. 6, by the supply of compressed air to the actuators 28 from the line 30. In the example shown, the latter is connected to a suitable compressed air supply source (not shown) through the electrically controlled or solenoid valve 31 having a control winding 32 and being normally in the closed position as shown in the drawing. Upon excitation of the winding 32 by a control current, the valve will be opened to admit air under pressure to the device 28 through line 30, as well as to a line 33 connected to a further pneumatic control valve 34 to be described presently. The material expelled from the filters by the blowing tubes and intercepted during the normal operation of the exhaust system may be collected in a removable container or the like or disposed of in any other suitable manner, as described in further detail hereafter.

The operation of the system comprising the shutters 12, the motor 26 and the compressed air supply may be controlled either manually or automatically at certain predetermined time intervals by means of a suitable timing and control device. Alternatively, the operation may be controlled or initiated by the provision of suitable sensing means responsive to the degree of clogging or contamination of the screens, as will be described in greater detail hereafter in reference to FIG. 2A. In the latter, the numeral 43 represents a source projecting a beam of light or the equivalent through the screens 11 and unto a photoelectric cell 44 which is connected in an electric circuit designed to produce a control or output current upon the intensity of said beam being reduced to a predetermined limit by the particles collected by the screens, that is, corresponding to a predetermined degree of contamination of the screens during the normal exhaust operation. The photoelectric current serves to initiate the operation of a clockwork or the like timing device 45 having a moving contact arm 46 which cooperates with a primary fixed contact 47 and a plurality of secondary contacts 48 in predetermined time sequence determined by the design of the contacts and the speed of the clockwork. Contact 47 is connected through a relay (not shown) with the motor 26, while the contacts 45 are connected each to one of the solenoid windings 32 of the control valves 31 cooperating with the filter units of the system, that is, four such valves and solenoids being provided according to the example shown by the drawings and serving to control the respective shutters of the filter units.

In operation, after movement of the contact arm 46 has been initiated by the photoelectric cell 44, the motor 26 is set into motion by the closing of the contacts 46 and 47, whereby to start the up and down movement of the blowing tubes 14 of the screens 11 together with the simultaneous actuation of the respective solenoid valve 31 by closure of the contacts 46 and one of the contacts 48. This will result in the supply of compressed air to both lines 30 and 33 and, in turn, in the operation or closure of the respective shutter 12 by the associated actuator 28, while at the same time connecting the reservoir 16 to the respective blowing tubes by the valve 34, to initiate the blowing or cleaning of the respective pair of screens or filter unit. During this period, the remaining shutters stay in the open position and the associated blowing tubes remain inoperative in the absence of compressed air being supplied thereto, whereby to enable the operation of the main exhaust or air stream to be continued through the conduit 10 in a substantially unobstructed manner and without interruption of the operation of the ventilation, air conditioning or the like system embodying the filtering or cleaning device according to the invention.

After the switch arm 43 has passed from one to the next contact 48, the shutter of the cleaned screens will be opened and the shutter of the next following screen unit closed and its associated blowing tubes supplied with compressed air, and so on for the next succeeding filter units until after cleaning of the entire filter system has been completed. At this time, the switch arm 46 returns to the zero or starting position and the device will be ready for a new blowing or cleaning operation after collection of a sufficient amount of particles by the screens as determined by the characteristics and adjustment of the photoelectric circuit. In place of a photoelectric cell, other sensing devices responsive to the contamination of the screen may be utilized, such a flow differential meter responsive to the air pressure in front and behind the screens and the like devices known in the art.

The material expelled by the blowing tubes may be collected in a removable container 35 disposed upon the bottom of the conduit or passage 10 as shown in FIG. 3, or a disposable collecting bag or the like 37 may be provided for the same purpose disposed below the bottom of the conduit in cooperation with a chute or the like 36 passing through an opening in the bottom of the conduit, as shown in FIG. 4. Alternatively, the material collected in the space 40 may be removed by means of a separate suction stream through the exit spacing or conduit 38, as shown at e in FIG. 5.

The blowing operation from the downstream side of the screens in respect to the main exhaust stream being filtered has the advantage of minimizing or substantially preventing damage to the rather delicate screen or filter structures. Besides, all the moving parts, such as the guide members, the reciprocating drive means and the blower or compressor being located at the downstream side can be operated and attended to most easily and expeditiously.

Referring to the modified arrangement of the system according to the invention as shown by FIGS. 6 and 7, there is provided a collecting space 40 for the extracted and expelled material below the screens 11, the same as in FIG. 5, in conjunction with a closure device or shutter 42 disposed in the exhaust duct 38 and arranged for unicontrol together with the arms 29 of the actuators 28 controlling the shutters 12 of the filter units. In operation, closing of one of the shutters 12 by the device 28 and operation of the blowing tubes of the associated screen unit at the same time causes the opening of the shutter 42 to admit a suction air stream for the removal of the material collected in the space 40, as indicated by the arrow f in the drawing. The exhaust suction stream for the removal of the collected material may be supplied by an additional blower or reservoir (not shown) being connected simultaneously with the connection of the main reservoir 16 through control by the valve 34. This operation or control has the advantage that the blower for the removal of the material may be of reduced size and capacity due to its operation with a single screen unit only at a time during a complete cleaning operation.

In the foregoing the invention has been described in reference to a specific operative device. It will be evident, however, that variations and modifications as well as the substitution of equivalent parts or elements for those shown and disclosed herein for illustration, may be made without departing from the broader purview and spirit of the invention as set forth in the appended claims. The specification and drawings are accordingly to be regarded in an illustrative rather than in a restrictive sense.

I claim:

1. In filtering apparatus for removing dust, fibers and other particles from an exhaust air or the like stream passing through a horizontal conduit, a plurality of juxtaposed vertical filtering screens disposed transversely across said conduit, whereby each of said screens intercepts a fractional cross-sectional portion of the total stream through said conduit, to remove the particles contained therein, screen cleaning means comprising a blowing tube for each screen arranged closely adjoining the surface on the downstream side thereof, said tubes being provided with exit ports on their sides adjacent to said screens, first operating means to move all said tubes in unison to and fro over the areas of the respective screens, a plurality of adjustable shutters one for each screen and disposed on the upstream side thereof, to pass and intercept, respectively, the respective fractional portions of the total stream through said conduit, second operating means effective during the operation of said first operating means, to selectively apply compressed air to any one of said tubes, to clean the associated screen substantially without interrupting the filtering action of the remaining screens, and means synchronized with said second operating means to close the shutters of the respective screens during the cleaning thereof by its associated blowing tube.

2. In filtering apparatus as claimed in claim 1, including timing control means to sequentially intermittently apply compressed air to said tubes and to close said shutters, to clean said screens in succession.

3. In filtering apparatus as claimed in claim 1, including timing control means to sequentially intermittently apply compressed air to said tubes and to close said shutters to clean said screens in succession by their associated blowing tubes, and further means responsive to the amount of contamination of the screens to initiate the operation of said timing control means.

4. In filtering apparatus for removing dust, fibers and other particles from an exhaust air or the like stream passing through a horizontal conduit, a plurality of juxtaposed pairs of vertical filter screens disposed across said conduit with the screens of each pair including an acute angle having its apex pointing in the direction of said stream, whereby to provide a plurality of V-shaped filter sections each intercepting a fractional cross-sectional portion of the total stream through said conduit, to remove the particles contained therein, screen cleaning means comprising a blowing tube for each screen arranged closely adjoining the downstream surface thereof, said tubes being provided with exit ports on their sides adjacent to said screens, first operating means to move all said tubes in unison to and fro over the area of the respective screens, a plurality of adjustable shutters one for each screen section and disposed across the upstream end thereof, to pass and interrupt the respective partial streams through said conduit, second operating means effective during the operation of said first operating means, to selectively apply compressed air to the blowing tubes of any of said screen sections, to clean the same substantially without interrupting the filtering action of the remaining screen sections, and further means synchronized with said second operating means to close the shutters of the respective filter sections during the cleaning thereof by its associated blowing tube.

5. In filtering apparatus as claimed in claim 4, a discharge conduit for each of said filter sections to collect the matter intercepted thereby, and valve means operated in synchronism with said shutters, to apply suction to the respective discharge conduit for the removal of the collected matter during the associated filter cleaning operations.

References Cited in the file of this patent
UNITED STATES PATENTS

| | | |
|---|---|---|
| 407,948 | Case | July 30, 1889 |
| 2,178,463 | Bahnson | Oct. 31, 1939 |
| 2,576,656 | Wallin | Nov. 27, 1951 |
| 2,594,957 | Martens | Apr. 29, 1952 |

OTHER REFERENCES

German application, I8,770, III/5oe, Nov. 29, 1956.